United States Patent [19]

Kanno

[11] Patent Number: 5,406,480
[45] Date of Patent: Apr. 11, 1995

[54] BUILDING AND UPDATING OF CO-OCCURRENCE DICTIONARY AND ANALYZING OF CO-OCCURRENCE AND MEANING

[75] Inventor: Yuji Kanno, Kawasaki, Japan

[73] Assignee: Matsushita Electric Industrial Co., Ltd., Osaka, Japan

[21] Appl. No.: 4,029

[22] Filed: Jan. 15, 1993

[30] Foreign Application Priority Data

Jan. 17, 1992 [JP] Japan ................................ 4-006454

[51] Int. Cl.$^6$ ...................... G06F 15/38; G06F 15/40
[52] U.S. Cl. ........................... 364/419.08; 364/419.11
[58] Field of Search ...................... 364/419.02, 419.08, 364/419.11

[56] References Cited

U.S. PATENT DOCUMENTS 4,916,614  4/1990  Kaji et al. .................... 364/419.02
5,227,971  7/1993  Nakajima et al. .............. 364/419.02

FOREIGN PATENT DOCUMENTS 347547  7/1991  Japan .

OTHER PUBLICATIONS

"Automatic Learning for Semantic Collocation" by S. Sekine et al.
"A Statistical Approach to Machine Translation" by P. F. Brown et al.; Computational Linguistics vol. 16, No. 2, Jun. 1990; pp. 79–85.
"An Algorithm of Word Clustering from Co-occurrence Data Using DM Decomposition and Statistical Estimation" by T. Matsukawa et al.; (Translation: abstract only) Shizen Gengo Shori (Natural Language Processing) 72–8; May 19, 1989; pp. 1–8.

Primary Examiner—Gail O. Hayes
Assistant Examiner—Xuong M. Chung-Trans
Attorney, Agent, or Firm—Lowe, Price, LeBlanc & Becker

[57] ABSTRACT

A co-occurrence dictionary is built through a process for calculating three kinds of co-occurrence information and a real number vector corresponding to each category. The co-occurrence dictionary is updated through a process for selecting the opposite phrase of the co-occurrence for the additional co-occurrence information and a process for calculating a real number vector corresponding to an additional word on the basis of the additional co-occurrence information. A co-occurrence analysis is effected through a process for calculating in real number the degree of the co-occurrence on the basis of the real number vectors corresponding to two categories to be checked in the co-occurrence relation, and a semantic analysis is effected through a process for indicating, by a numerical value, the propriety of the interpretation on the basis of the degree of each co-occurrence.

9 Claims, 14 Drawing Sheets

FIG. 6

| NOTATION 501 | READING 502 | FEATURE VECTOR 503 |
|---|---|---|
| 苦情 | くじょう | (−0.3671, −0.0245, −0.0828, 0.1977, −0.1117) |
| 到着 | とうちゃく | (−0.3924, −0.0592, −0.0562, −0.0495, 0.1510, −0.1211) |
| 雨音 | あまおと | (−0.7468, −0.0235, −0.0767) |
| 雨垂れ | あまだれ | (−0.5696, −0.0272, −0.1257, −0.1000, −0.0607, 0.2561) |
| アクション | あくしょん | ( 0.1013, −0.0863, −0.0697, −0.0144) |
| 続出 | ぞくしゅつ | (−0.4684, −0.0501, −0.1447, 0.0076) |
| 到来 | とうらい | (−0.5443, −0.0360, −0.1197, −0.0957, 0.0295) |
| 審議 | しんぎ | ( 0.0633, −0.0871, 0.0599, 0.1834, −0.0512) |
| 神技 | しんぎ | (−0.0362, 0.1056, 0.0189, −0.0352) |
| 圧力 | あつりょく | (−0.5190, −0.0252, −0.1031, 0.1410, 0.0212, −0.0045) |
| ... | | |

FIG. 7

| NOTATION 601 | READING 602 | CASE PATTERN 603 | | FEATURE VECTOR/EXCEPTION 604 |
|---|---|---|---|---|
| 会う/遭う | あ[う] | ガ | ニ | (−7.1403, 0.0156, 2.4827)<br>( 3.9109, −5.5240, 5.2896, −2.2118)<br>[例外：寝返り, 不祥事] |
| 上る/上がる | あが[る] | ガ | | (10.4598, 0.6117, −0.7247, 1.3255)<br>[例外：宿題, 仕事, 足慣らし] |
| 諦める | あきらめ[る] | ガ | ヲ | (−7.9261, −0.0237)<br>(10.3486, 1.1797, 0.4960, 1.9518, 0.3159)<br>[例外：返事] |
| ⋮ | | | | |

| NOTATION | READING | SEMANTIC LABEL |
|---|---|---|
| 苦情 | くじょう | 3.1.5 |
| 到着 | とうちゃく | 3.1.4, 4.2 |
| 雨音 | あまおと | 3.1.5, 6.3, 7.5 |
| 雨垂れ | あまだれ | 3.1.7, 6.3 |
| アクション | あくしょん | 3.2.1, 1.8.6 |
| 続出 | ぞくしゅつ | 3.1.5 |
| 到来 | とうらい | 3.1.4, 4.2 |
| 審議 | しんぎ | 3.1.6 |
| 神気 | しんき | 3.2.1, 4.2 |

FIG. 13 PRIOR ART

| NOTATION | READING | CASE PATTERN | SEMANTIC LABEL |
|---|---|---|---|
| 会う/遭う | あ[う] | ガ | 2.1, 5.6 |
|  |  | ニ | 3.1, 4.2 |
| 上る/上がる | あが[る] | ガ | 3.1, 3.2, 3.3 |
| 諦める | あきらめ[る] | ガ | 2.1, 5.6 |
|  |  | ヲ | 3.1, 3.2, 3.3, 3.5 |

BUILDING AND UPDATING OF CO-OCCURRENCE DICTIONARY AND ANALYZING OF CO-OCCURRENCE AND MEANING

BACKGROUND OF THE INVENTION

The present invention relates generally to natural language processing techniques to be used in computer applied systems such as word processors, machine translations and interactive systems, and more particularly to an apparatus and method of building and updating a semantic analysis co-occurrence dictionary and an apparatus and method of analyzing co-occurrences and meanings.

Recently, various computer application systems have been researched and developed on the basis of the natural language processing techniques and a portion of the various computer applied systems are gradually being fixed in our language culture. Particularly, in Japan, the progress of the kana-kanji conversion technique allows easy input of sentences, comprising a mixture of kanji and kana, to computers, whereby text processing softwares on Japanese word processors and personal computers are used widely. However, we do not still have an effective means to represent and process the meaning of words and the semantic relation between words for selecting a correct word from homonyms on the kana-kanji conversion. In the present stage, it is common practice in the machine translation or the like to process the meaning of words in accordance with the semantic analysis technique based on the case grammer described by C. J. Fillmore and to use semantic labels in the co-occurrence analysis. A description will be made hereinbelow with reference to FIGS. 8 to 13 in terms of a conventional co-occurrence analysis method using the semantic label, a conventional semantic analysis method using this conventional co-occurrence analysis method, and a conventional co-occurrence dictionary building and updating method necessary for these analysises.

FIG. 8 is a block diagram showing one example of Japanese sentence analysis apparatus based on the conventional semantic analysis method. In FIG. 8, numeral 701 represents an inputting means for inputting a sentence to be analyzed, 702 designates a morphological analysis means for dividing the inputted sentence into a list (string) of morphphemes (morphemes), 703 denotes a morphpheme dictionary to be retrieved by the morphological analysis means 702 when performing the morphological segmentation, 704 depicts a connection rule to be used by the morphological analysis means 702 when performing the connection test between the morphphemes, 705 indicates a syntactic analysis means for inputting the list (string) of morphphemes from the morphological analysis means 702 to analyze the syntactic structure and output the syntactic tree, 706 represents a context-free grammar rule to be used by the syntactic analysis means 705 when performing the syntactic structure analysis, 707 designates a semantic analysis means for inputting the syntactic tree from the syntactic analysis means 706 to perform the case analysis and output the semantic structure, 708 denotes a verbal case dictionary to be used by the semantic analysis means 707, 709 depicts a noun semantic label dictionary to be used by the semantic analysis means 707, and 710 indicates a semantic structure storing means for storing a semantic structure centering the case frame produced by the semantic analysis means 707, which is referred to and operated by an external apparatus. The noun semantic label dictionary 709 to be used for the semantic analysis describes the meaning of each of nouns within the morphpheme dictionary 703 with above one semantic label in accordance with the semantic classification standard as shown in FIG. 11 and has the contents as shown in FIG. 12. Further, the verbal case dictionary 708 divides the meaning of each of the verbs within the morphpheme dictionary 703 into one case pattern or more and describes them as illustrated in FIG. 13. As well as the noun semantic label dictionary 709, the meaning of the noun co-occuring with each case slot is described with one semantic label or more in accordance with the semantic classification standard shown in FIG. 11.

The operation of the conventional sentence analysis apparatus thus arranged will be described hereinbelow in terms of the case of analyzing the typed sentence "AがBをC にVする". First, the typed sentence "AがBをCにVした" is supplied as a character train through the inputting means 701 to the morphological analysis means 702. The morphological analysis means 702 performs the morphological segmentation process from the beginning of the sentence toward the end of the sentence. If the morphpheme coincident with a portion of the inputted sentence train is found by the retrieval of the morphpheme dictionary 703, the connection possibility to the morphpheme immediately before the found portion is checked through the connection rule 704. If the connection is possible, the morphological segmentation process is further effected in terms of the inputted sentence train subsequent to the found portion. If a plurality of morphphemes coincident therewith are found by the retrieval of the morphpheme dictionary 703, the priority is given therebetween in accordance with a heuristic method such as the maximum coincidence and the minimum clause number. Thus, the following list (string) of morphphemes up to the end of the sentence can be obtained.

"A (noun), が (case post-positional particle), B (noun), を (case post-positional particle), C (noun), に (case post-positional particle), V (verb), (ending of verb), し (ending of verb), た (past auxiliary verb)"

The aforementioned morphpheme train is supplied to the syntactic analysis means 705 so as to analyze the syntactic structure to obtain a syntactic tree as illustrated in FIG. 14. From this syntactic tree, it is understood that all of the three post-positional phrases "A が", "B を" and "C に" are connected or applied to the verb phrase "Vする".

The syntactic tree illustrated in FIG. 14 is led to the semantic analysis means 707 so as to perform the semantic analysis of the inputted sentence in accordance with the procedure illustrated in FIG. 9 which shows a procedure for the semantic analysis of a sentence "AがBをCにVする". First, the case patterns of the verb "V" are obtained by retrieving the verbal case dictionary 708, and the semantic labels respectively corresponding to the nouns "A", "B" and "C" are obtained by retrieving the noun semantic label dictionary 709 (step 801). Secondly, it is checked, in accordance with the co-occurrence analysis procedure illustrated in FIG. 10, whether the case slot corresponding to the semantic label of the noun of each of the post-positional phrases co-occurs with respect to each of the case patterns of the verb V. That is, only the case patterns with which all the three nouns co-occur are selected as a candidate, and further the best case pattern is selected on the basis of the priority between the case patterns, the filling degree of the case slot and others so that information such as the tense and the voice is added to the selected case pattern which is in turn outputted as the semantic structure (steps 802 to 812).

In the co-occurrence analysis procedure, as illustrated in FIG. 10 which shows a procedure of the analysis as to whether or not the noun N, being the C case, co-occurs with the case pattern P of the verb V, it is first checked whether the C case is in the case of the case pattern P (step 901). If the C case exists therein, it is checked whether there is a common semantic label between a group of semantic labels in the case slot of the C case of the case pattern P and a group of semantic labels of the noun N (step 902). If the common semantic label exists therebetween, the decision of the co-occurrence is made (step 903), and if not existing therebetween, no co-occurrence is decided (step 904). Further, if there is no C case in the cases of the case pattern P, it is checked whether the C case can be taken as the optional case such as the time and the place (step 905). If not, the decision of no co-occurrence is made (step 904). If so, the case slot information of the optional case which does not depend on the verb is retrieved so as to check whether there is a common semantic label between a group of semantic labels in the optional case slot and a group of semantic labels of the noun (step 906). If the common semantic label exists therebetween, the decision of the co-occurrence is made (step 903). On the other hand, if not existing therebetween, the decision of no co-occurrence is made (step 903).

The above-mentioned verbal case dictionary 708 and noun semantic label dictionary 709 to be used for the sentence analysis apparatus are paired so as to construct the co-occurrence dictionary. Conventionally, this construction is entirely effected by hand. A description will be made hereinbelow in terms of the typical procedure of the construction of the co-occurrence dictionary. First, one or plural specialists determine the semantic classification standard, as illustrated in FIG. 11, with reference to dictionaries, past systems and others. Secondly, one or plural workers give one or more semantic labels to each of the nouns in the morphpheme dictionary 703 on the basis of the determined semantic classification standard. Further, one or plural workers classify each of the verbs in the morphpheme dictionary 703 into one or more subsheets different in the case pattern and the regulation information such as the rule, voice and phase, and successively state the case pattern information and the other regulation information at every case subsheet as shown in FIG. 13. If the failure of the semantic classification standard has been found at the stage of the co-occurrence dictionary construction, the addition to the semantic classification standard and the change of the semantic classification standard can be performed. Further, a customary and special co-occurrence relation such as " かぜをひく " is directly stated as an exception in the verbal case dictionary and exception-processed prior to the aforementioned semantic analysis or after a failure of the aforementioned semantic analysis. The updating of the co-occurrence dictionary is also effected by a hand to take a matching with the construction members of the co-occurrence dictionary totally taking into account the semantic classification standard and the contents of the co-occurrence dictionary built hitherto. For a large-scale updating, the addition and change of the semantic classification standard are generally made.

There is a problem which arises with such a conventional method, however, in that there is no systematic and objective method for the construction and updating of the co-occurrence dictionary, and hence the construction and updating of the co-occurrence dictionary greatly depend upon the know-how and skill of the language specialist or the like. That is, since the building method of the semantic label system is not clear, the kind and interpretation of the semantic label are required to be set by hand of the specialist before building the noun semantic dictionary and the verbal case dictionary, and therefore the addition and change of the system are required in the actual dictionary construction and analysis because the semantic label system is rough and insufficient in kind. Further, since the interpretation of each of the semantic labels cannot be made clear, for building a large-scale dictionary by a plurality of persons, difficulty is encountered to adequately give a set of semantic labels to each word and discrepancies of interpretation occurs between the workers. In addition, in the case the end user uses a computer application system including a semantic analysis system and registers an unknown word, it is difficult that the end user understands the semantic label system of the system to adequately give semantic labels, whereby difficulty is encountered to easily update the co-occurrence dictionary by the end user.

In addition, there are several problems in accuracy of the co-occurrence analysis and semantic analysis. First, since difficulty is encountered to accurately build the co-occurrence dictionary, the semantic label is rough, and particularly the accuracy of the co-occurrence analysis between an abstract noun and the case slot thereof becomes deteriorated. For example, words pronounced as " かんしょう " are above 20 in number and are abstract nouns, and hence difficulty is encountered to convert them into kanji in accordance with the conventional co-occurrence analysis. Moreover, difficulty is encountered to accurately determine the case frame, which is a principle portion of the semantic analysis, and the priority thereof.

SUMMARY OF THE INVENTION

It is therefore an object of the present invention to provide a method of systematically and accurately building a co-occurrence dictionary, a method of easily performing the consistent updating of the co-occurrence dictionary, a co-occurrence analysis method which is capable of accurately calculating the degree of the co-occurrence, a semantic analysis method which is capable of numerically and accurately calculating the ranking of the priority between the competitive interpretations.

According to the present invention, the co-occurrence dictionary building method includes a process for calculating three kinds of co-occurrence information and a real number vector corresponding to each category, the co-occurrence dictionary updating method includes a process for selecting the peer lexicon or phrase of the co-occurrence for the additional co-occurrence information and a process for calculating a real number vector corresponding to an additional word on the basis of the additional co-occurrence information, the co-occurrence analysis method includes a process for calculating in real number the degree of the co-occurrence on the basis of the real number vectors corresponding to two categories to be checked in the co-occurrence relation, and the semantic analysis method includes a process for indicating, by a numerical value, the propriety of the interpretation on the basis of the degree of each co-occurrence.

More specifically, as illustrated in FIG. 1, for building the co-occurrence dictionary describing as to whether the phases belonging to two categories in a dictionary containing phrases of the natural language which is an object co-occur in one sentence, phases are selected as a group of phrases 11 from a group of phrases 1 comprising all the phrases belonging to the first category in the dictionary and phrases are selected as a group of phrases 21 from a group of phrases 2 comprising all the phrases belonging to the second category in the dictionary, and there are prepared three kinds of co-occurrence information: first co-occurrence information describing as to whether each phrase belonging to the phrase group 11 and each phrase belonging to the phase group 21 co-occur in one sentence of the object language, second co-occurrence information describing as to whether each phrase belonging to a group of phrases 12 comprising all the phrases which do not belong to the phrase group 11 in the phrase group 1 and each phrase belonging to the phrase group phrase group 21 co-occur in one sentence of the object language and third co-occurrence information describing as to whether each phrase belonging to a group of phrases 22 comprising all the phrases which do not belong to the phrase group 21 in the phrase group 2 and each phrase belonging to the phrase group 11. Secondly, the first co-occurrence information is arranged such that each phrase belonging to the phrase group 11 corresponds to a real number vector with a dimension below the common maximum dimension and each phrase belonging to the phrase group 21 is corresponds to a real number vector with a dimension below the common maximum dimension, and the value of real number vector corresponding to each phrase in the phrase group 11 and the value of the real number vector corresponding to each phrase in the phrase group 21 are calculated on the basis of the first co-occurrence information so that the number of sets of two phrases that the value of the inner product of the real number vector corresponding to the phrase 1 and the real number vector corresponding to the phrase 2 becomes positive in the case of describing, in the first co-occurrence information, that a phrase 1 belonging to the phrase group 11 and a phrase 2 belonging to the phrase group 21 co-occur in one sentence and the value of the inner product of the real number vector corresponding to the phrase 1 and the real number vector corresponding to the phrase 2 becomes negative in the case of describing, in the first co-occurrence information, that the phrase 1 belonging to the phrase group 11 and the phrase 2 belonging to the phrase group 21 do not co-occur in one sentence becomes the greatest of all the numbers of sets each comprising a phrase(s) belonging to the phrase group 11 and a phrase belonging to the phrase group 21. Further, the second co-occurrence information is arranged such that each phrase belonging to the phrase group 12 corresponds to a real number vector with a dimension below the maximum dimension, and the value of the real number vector corresponding to each phrase in the phrase group 12 is calculated on the basis of the second co-occurrence information so that the number of sets of two phrases that the value of the inner product of the real number vector corresponding to a phrase 3 belonging to the phrase group 12 and the real number vector corresponding to a phrase 4 belonging to the phrase group 21 and calculated on the basis of the first co-occurrence information becomes positive in the case of describing, in the second co-occurrence information, that the phase 3 and the phrase 4 co-occur in one sentence and the value of the inner product of the real number vector corresponding to the phrase 3 and the real number vector corresponding to the phrase 4 becomes negative in the case of describing, in the second co-occurrence information, that the phrase 3 and the phrase 4 do not co-occur in one sentence becomes the largest of all the numbers of sets each comprising a phrase(s) belonging to the phrase group 12 and a phrase belonging to the phrase group 21. Still further, the third co-occurrence information is arranged such that each phrase belonging to the phrase group 22 corresponds to a real number vector with a dimension below the maximum dimension, and the value of the real number vector corresponding to each phrase in the phrase group 22 is calculated on the basis of the third co-occurrence information so that the number of sets of two phrases the inner product of the real number vector corresponding to a phrase 5 belonging to the phrase group 11 and calculated on the basis of the first co-occurrence information and the real number vector corresponding to a phrase 6 belonging to the phrase group 22 becomes positive in the case of describing, in the third co-occurrence information, that the phrase 5 and the phrase 6 co-occur in one sentence and on the other hand the inner product of the real number vector corresponding to the phrase 5 calculated on the basis of the first co-occurrence information and the real number vector corresponding to the phrase 6 becomes negative in the case of describing, in the third co-occurrence information, that the phrase and the phrase 6 do not co-occur in one sentence becomes the greatest of all the numbers of sets each comprising a phrase(s) belonging to the phrase group 11 and a phrase belonging to the phrase group 22. Thus, the co-occurrence information are calculated in real number vector form with respect to all the phrases of the phrase group 1 and the phrase group 2.

Further, for calculating the real number vector corresponding to each phrase on the basis of the first co-occurrence information, the first co-occurrence information is corrected by exceptionally reversing the decision of the co-occurrence with respect to a portion of the first co-occurrence information so that the number of sets of two phrases that the value of the inner product of the real number corresponding to the phrase 1 belonging to the phrase group 11 and the real number vector corresponding to the phrase 2 belonging to the phrase group 21 becomes positive in the case of describing that the phrase 1 and the phrase 2 co-occur in one sentence and the value of the inner product of the real number vector corresponding to the phrase 1 and the real number vector corresponding to the phrase 2 becomes negative in the case of describing, in the first co-occurrence information, that the phrase 1 and the phrase 2 do no co-occur in one sentence be above a constant ratio (rate) to the number of all sets each comprising a phrase(s) belonging to the phrase 11 and a phrase(s) belonging to a phrase group 21, and this corrected first co-occurrence information is used as the first co-occurrence information and the co-occurrence information are calculated in real number vector form with respect to all the phrases of the phrase group 1 and the phrase group 2. Thus, the co-occurrence information are calculated in the real number vector form and in exception information form.

In addition, for updating the co-occurrence dictionary, in the co-occurrence dictionary built in accordance with the above-described method or the like which describes as to whether each phrase belonging to a first category and each phrase belonging to a second category co-occur in one sentence in a dictionary containing phrases of the object natural language and describing each phrase in a real number vector form, when adding a new phrase 7 belonging to the first category to the aforementioned co-occurrence dictionary, a group of phrases 23 consisting of N phrases in the above-mentioned dictionary and belonging to the second category and being above the maximum dimension of the corresponding vectors are selected so that the absolute value of the inner product of the real number vectors corresponding to every two phrase of the N phrases is below a given constant value, and additional co-occurrence information indicative of whether the N phrases and the phrase 7 co-occur in one sentence of the object language is added and the phrase 7 is arranged to correspond to a real number vector having a dimension below the aforementioned maximum dimension, and further the real number vector V corresponding to the phrase 7 is calculated so that the number M of sets of two phrases that the value of the inner product of the real number vector corresponding to the phrase 7 and the real number vector corresponding to a phrase 8 belonging to the phrase group 23 becomes positive in the case of describing in the additional co-occurrence information that the phrase 8 and the phrase 7 co-occur in one sentence and the value of the inner product of the real number vector corresponding to the phrase 7 and the real number vector corresponding to the phrase 8 becomes negative in the case of describing in the additional co-occurrence information that the phrase 8 and the phrase 7 do not co-occur in one sentence has a maximum, and the the calculated real number vector V is added as the co-occurrence information for the phrase 7 to the above-mentioned co-occurrence dictionary.

Further, in the case that the number M is below a predetermined number L, a group of phrases 24 whose number is constant are selected from the second category, and readditional co-occurrence information indicative of whether the phrase group 24 and the phrase 7 co-occur in one sentence of the object language is added so as to correct the additional co-occurrence information so that the co-occurrence decisions of the additional co-occurrence information and a portion of the readditional co-occurrence information are exceptionally reversed, and the real number vector corresponding to the phrase 7 is calculated on the basis of the corrected additional co-occurrence information so that the number M become above the predetermined number L, and the calculated real number vector is added as the co-occurrence information for the phrase 7 to the above-mentioned co-occurrence dictionary.

For performing the co-occurrence analysis to mechanically decide whether phrases which are included in a dictionary comprising the object natural language and which belong to two kinds of categories co-occur in one sentence, there is used the co-occurrence dictionary which is built and updated in accordance with the above-described method or a similar method and which describes the co-occurrence information by the real number vectors corresponding to the phrases. When the phrase 1 included in the first category in the above-mentioned co-occurrence dictionary and the phrase 2 included in the second category in the above-mentioned co-occurrence dictionary appear at positions, allowable on the morphphemeand syntax, in the sentence to be analyzed, in the case that the inner product of the real number vector corresponding to the phrase 1 and the real number vector corresponding to the phrase 2 is positive, a decision is made such that the phrase 1 and the phrase 2 co-occur, and on the other hand, in the case that the inner product of the real number vector corresponding to the phrase 1 and the real number vector corresponding to the phrase 2 is negative, a decision is made such that the phrase 1 and the phrase 2 does not co-occur.

Further, for performing the semantic analysis, when the phrase 1 and the phrase 2 in the sentence to be analyzed have morphological and/or syntactic ambiguities, the interpretation that the absolute value of the inner product of the real number vector corresponding to the phrase 2 and the real number vector corresponding to the phrase 1 calculated in accordance with the above-described co-occurrence analysis method is the greatest value or a group of interpretations that the aforementioned absolute value of the inner product is above a constant value is used, and the other interpretations are rejected.

BRIEF DESCRIPTION OF THE DRAWINGS

The object and features of the present invention will become more readily apparent from the following detailed description of the preferred embodiments taken in conjunction with the accompanying drawings in which:

FIG. 6 shows a portion of the contents of a noun semantic dictionary in the second embodiment;

FIG. 7 illustrates a portion of the contents of a verb semantic dictionary in the second embodiment;

FIG. 11 shows a portion of a conventional semantic label system;

FIG. 12 shows a portion of the contents of a conventional noun semantic label dictionary;

FIG. 13 illustrates a portion of the contents of a conventional verb case dictionary.

DETAILED DESCRIPTION OF THE INVENTION

Embodiments of this invention will be described hereinbelow with reference to the drawings. In the embodiments, the object natural language is the Japanese language, the first category is the noun and the second category is the case of the verb.

Figure 1:
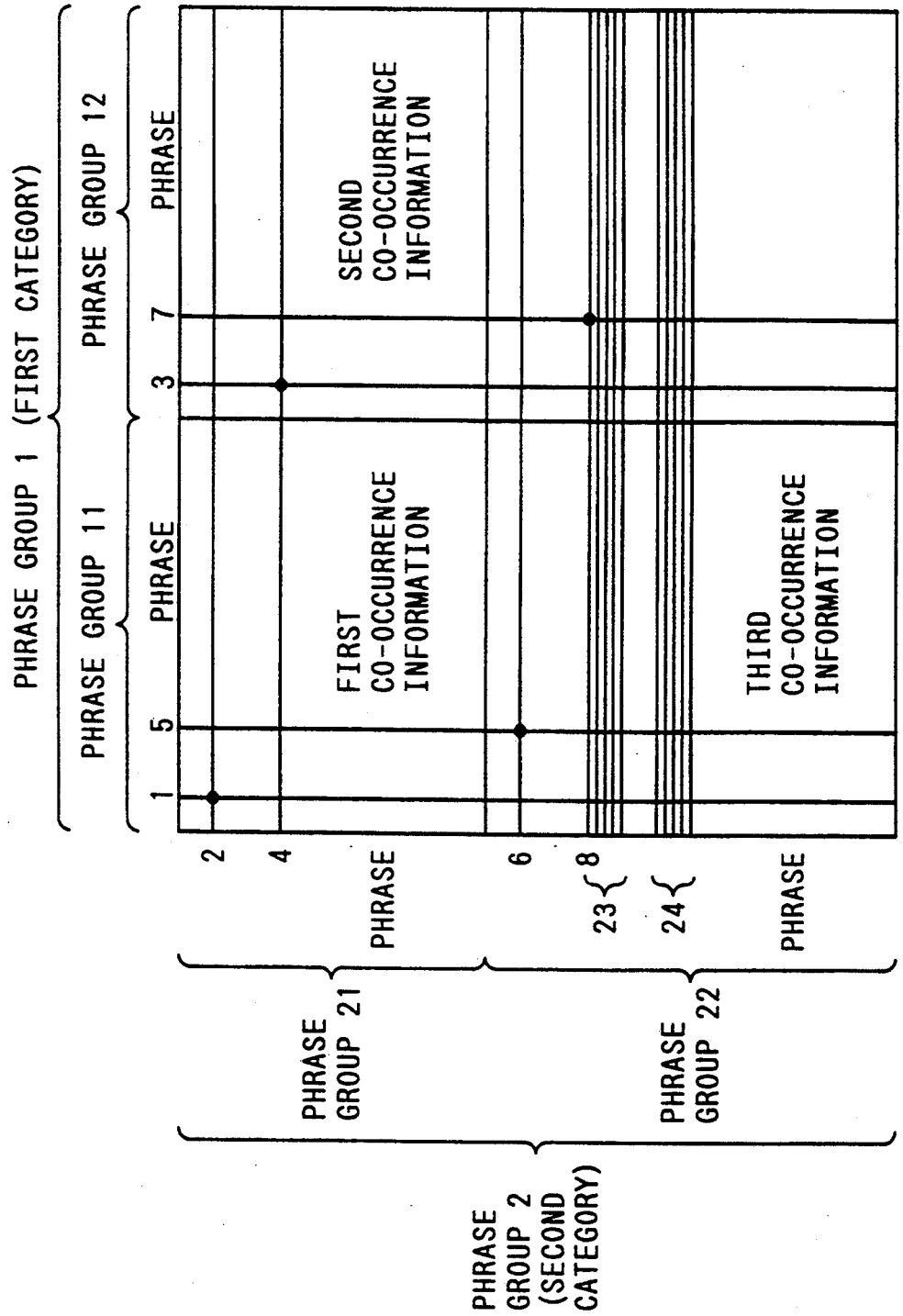
FIG. 1 is an illustration for describing a co-occurrence dictionary building and updating method and a co-occurrence and semantic analysis method according to the present invention.
Figure 2:
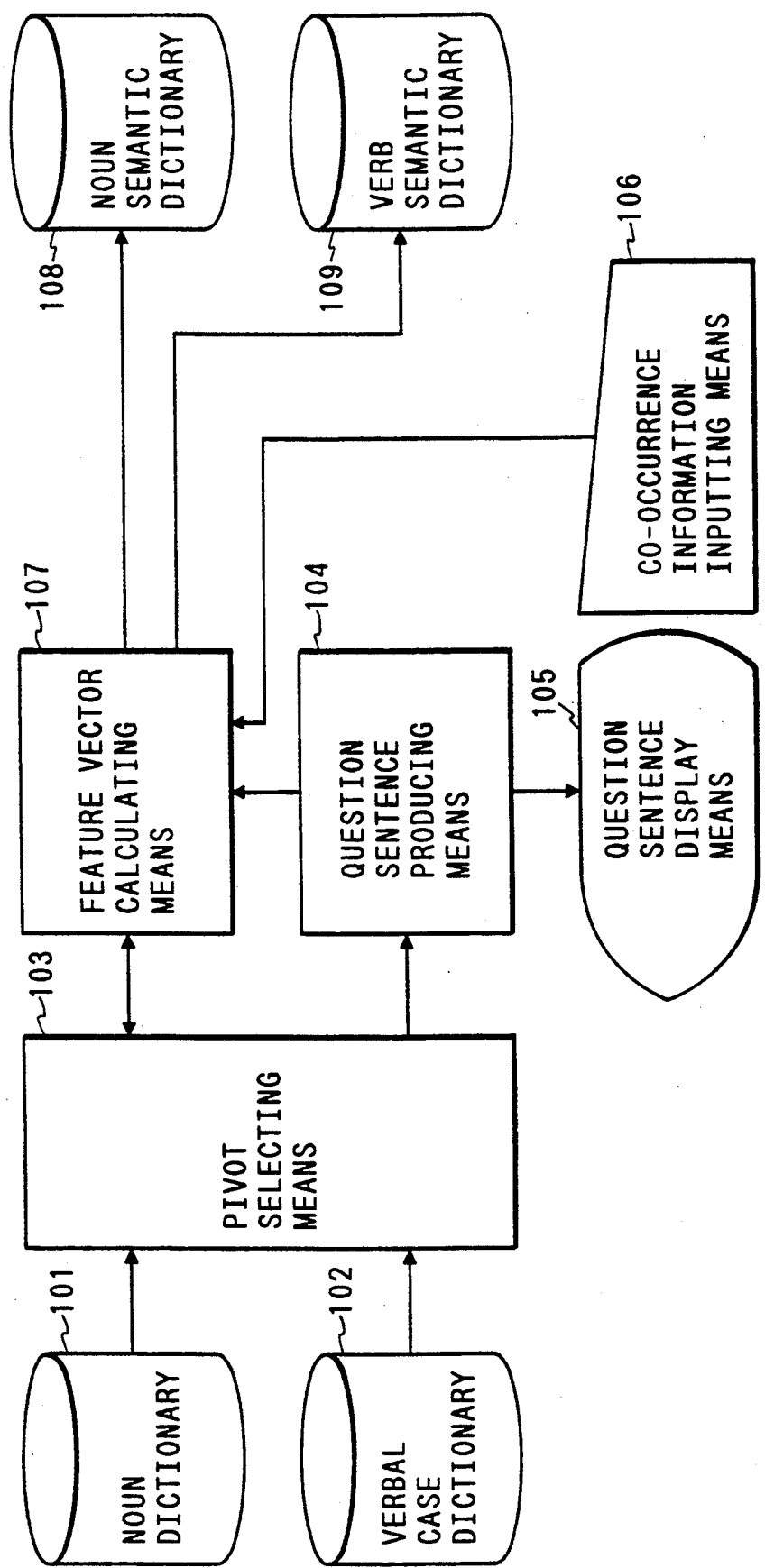
FIG. 2 is a block diagram showing an apparatus for building and updating a co-occurrence dictionary for the verb and the noun in the Japanese language.

FIG. 2 is a block diagram showing an apparatus according to a first embodiment of this invention to build and update the co-occurrence dictionary for the case of the verb and the noun in the Japanese language. In FIG. 2, the numeral 101 represents a noun dictionary describing the notation, reading and others of the noun in the Japanese language, 102 designates a verbal case pattern dictionary containing the typical noun which can be included in the surface case pattern of the verb in the Japanese language and the case slot, 103 denotes a pivot selecting means for selecting an element, which is the axis (center), from elements of the noun dictionary 101 and the verbal case pattern dictionary 102, and 104 depicts a question sentence producing means for producing a question sentence, to be shown for the co-occurrence information inputting person, on the basis of the element selected by the pivot selecting means 103. Further, numeral 105 is a question sentence indicating means for showing the co-occurrence information inputting person the question sentence produced by the question sentence producing means 104, 106 designates a co-occurrence information inputting means by which the co-occurrence inputting person inputs the co-occurrence information in accordance with the indication of the question sentence indicating means 105, 107 represents a feature vector calculating means for calculating, on the basis of the co-occurrence information from the co-occurrence information inputting means 106 and the selection result from the pivot selecting means 103, a feature vector to be given to each element, 108 denotes a noun semantic dictionary for encasing the noun dictionary information including the feature vector of the noun outputted from the feature vector calculating means 107, and 109 depicts a verb semantic dictionary for encasing the dictionary information of the case pattern of the verb including the feature vector of the case of the verb outputted from feature vector calculating means 107.

Here, in the verbal case pattern dictionary 102, the surface case pattern of each verb and the typical example of the noun are described in the form of "彼/特許課/ミルク ] が [ 被害/盗難 ] に会う/遭う".

Secondly, a description will be made in terms of the operation of the co-occurrence dictionary building apparatus thus arranged. Prior to the description of the operation of the co-occurrence dictionary building apparatus, the description of the formulas to be used for the description of the operation thereof will first be made hereinbelow. From the linear algebra, a n-row and v-column matrix C having a rank p can be expressed as the following equation (1) on the basis of a v-row and p-column orthogonal matrix A and an n-row and p-column orthogonal matrix B.

$$B \cdot C \cdot A^* = \Lambda \quad (1)$$
where
$\Lambda_{ij} = \lambda_i \quad (i = j)$
$\quad\quad\; 0 \quad\;\; (i \ne j)$
$\lambda_1 \geq \lambda_2 \geq \ldots \geq \lambda_p > 0$ Accordingly, the original matrix C can be changed into the following equation (2).

$$C = \sum_{k=1}^{p} \lambda_k b_k^* \cdot a_k \quad (2)$$

where $b_k$ and $a_k$ are respectively column vectors of the $k^{th}$ column of the matrixes B and A.

In the aforementioned equation (2), $\lambda$ is called the singular value of the matrix C and the right side of the equation (2) is called the spectral decomposition.

The spectral decomposition of the matrix C has the following properties. Now, let it be assumed that the matrix C with the rank p is approximated by a matrix D having a rank q smaller than the rank p. If the metric of the poorness of the approximation is measured on the basis of the Euclidean distance in accordance with the following equation (3), the matrix D which minimizes the metric $\delta$ of the poorness of the approximation can be given by the following equation (4) on the basis of the partial sum of the spectral decomposition of the matrix C.

$$\delta = \text{trace}\,[(D - C)(D - C)^*] = \sum_{i=1}^{n} \sum_{j=1}^{v} (d_{ij} - c_{ij})^2 \quad (3)$$

where $c_{ij}$ and $d_{ij}$ are the elements of the i row and j column of the matrixs C and D, respectively.

$$D = \sum_{k=1}^{q} \lambda_k b_k^* \cdot a_k \quad (4)$$

In addition, since the following equation (5) can generally be satisfied, the k-th term of the right side in the equation (4) scarcely contributes toward k satisfying the following equation (6).

$$||\lambda_k b_k^* \bullet a_k||^2 = \lambda_k^2 \quad (5)$$

$$\lambda_1 >> \lambda^k \quad (6)$$

First, a description will be made hereinbelow in terms of the definition of the respective variables. The total number of the nouns in the noun dictionary 101 is taken to be N and the total number of the cases in the verbal case pattern dictionary 102 is taken to be V. The case is determined to assume one sense if designating the case pattern of the verb and the order that the case in the case pattern appears. Further, a serial number starting from 1 is given to the N nouns and further to the V cases. In the case that the $i^{th}$ noun and the $j^{th}$ case co-occur, that is, if, when an adequate noun is applied to the other case, the sentence that the ith noun is applied to the $j^{th}$ case is semantically proper as a sentence of the Japanese language, an integer value M (above 1) is given. When not proper, a value 0 is taken. On the other hand, when delicate, a variable expressed by the following equation (7) is taken. The variable assumes an integer value (above 1 and below M) corresponding to the degree of the propriety.

Since one variable (the equation 7) can be taken at every combination of the N nouns and the V cases, the variables (the equation 7) can be given as a whole by a N-row and V-column matrix C. This matrix is referred to as co-occurrence data. When the persons performing the co-occurrence decision are different from each other, the co-occurrence data may vary even if both the noun and case are fixed. Further, even if the person performing the co-occurrence decision is fixed, the co-occurrence data also delicately varies in response to the change of the use field of the sentence to be decided or the change of the feeling at the time of the decision. Here, the value of the co-occurrence data is determined with such factors being disregarded or on the basis of the majority vote or average of a number of decisions or the decisions of a number of persons.

In the first stage for building the co-occurrence dictionary, the pivot selecting means 103 selects N1 nouns of the N nouns and V1 cases of the V cases at random or in accordance with the instruction previously given. In the second stage for building the co-occurrence dictionary, the question sentence producing means 104 successively produces the sentences made with each of the N1 nouns being applied to each of the V1 cases and the question sentence display means 105 shows the produced sentences to the co-occurrence information inputting person. For example, the sentence"

"[彼/特許課/ミルク]が 水泳に 会う/違う"

can be produced on the basis of a combination of the noun "水泳" and the case "[彼/特許課/ミルク] が?に 会う/違う". The co-occurrence information inputting person checks, through the question sentence display means 105, whether or not the sentence is proper as the Japanese language, and inputs an integer value in a range from 0 to M through the co-occurrence information inputting means 106. For example, in the case of the aforementioned sentence, most of the workers may input 0. The feature vector calculating means 107 sums up and accumulates the inputs from the co-occurrence information inputting means 106 so as to produce a N1-row and V1-column co-occurrence data C1. At this time, if the co-occurrence data varies due to the above-mentioned various factors, the above-mentioned adequate corrections are effected.

In the third stage for building the co-occurrence dictionary, the extraction of the exception is effected step by step so as to gradually lower the rank of the co-occurrence data. First, the spectral decomposition is effected in terms of the matrix C1. As a result, an integer k is obtained which is indicative of the dimension of the co-occurrence determined by i and j, and hence in terms of the integer m greater than k, the value of the variable (equation 7) indicative of the co-occurrence of the $i^{th}$ noun and the $j^{th}$ case can be reproduced because the partial sum from the first term to the $m^{th}$ term in spectral decomposition of C1 satisfies the following expression.

$$C_{ij} - \frac{1}{2} < \sum_{k=1}^{m} \lambda_k b_k^* \cdot a_{kij} < C_{ij} + \frac{1}{2} \qquad (8)$$

Thus, a combination that the above-mentioned co-occurrence dimension has a maximum is selected from all the combinations of the N1 nouns and the V1 cases, and this co-occurrence is stored as an exception and the co-occurrence information inputted is changed to other value so that the co-occurrence dimension relative to the combination becomes a minimum. This procedure of exception extraction and co-occurrence data change are repeatedly effected so as to gradually lower the rank of the co-occurrence data C1. This repetition is terminated when the rank of the co-occurrence data C1 is lowered to be below a predetermined value (for example, 16) or if the the number of the exceptions reaches a given constant value.

In the fourth stage for building the co-occurrence dictionary, real number vectors to be given to each of the nouns and each of the cases are calculated. That is, the maximum value Ti of the dimension of the co-occurrence in the case that the $i^{th}$ noun is fixed is obtained so that the Ti dimension vector (the following equation 9) is arranged to correspond to the $i^{th}$ noun.

$$t_i = (b_{i1}, b_{i2}, \cdots, b_{iTi}) \qquad (9)$$

where $b_{ik}$ is the $k^{th}$ element of the vector $b_i$.

Further, the maximum value $U_j$ of the dimension of the co-occurrence in the case of fixing the $j^{th}$ case is obtained so that the $U_j$ dimension vector (the following equation 10) is arranged to correspond to the $j^{th}$ case.

$$u_j = (\lambda_1 a_{j1}, \lambda_2 a_{j2}, \cdots, \lambda_{U_j} a_{juj}) \qquad (10)$$

where $a_{jk}$ is the $k^{th}$ element of the vector $a_j$.

These vectors (the equations 9 and 10) respectively represent the features of the co-occurrence of each of the nouns and each of the cases. Here, the equation (9) is referred to as the feature vector of the $i^{th}$ noun and the equation (10) is referred to as the feature vector of the $j^{th}$ case. Thus, at the time of the completion of the fourth stage, the feature vectors corresponding to the N1 nouns of the N nouns and the feature vectors corresponding to the V1 cases of the V cases are determined through the feature vector calculating means 107 and, together with the other dictionary information, stored in the noun semantic dictionary 108 and the verb semantic dictionary 109.

In the fifth stage for building the co-occurrence dictionary, the pivot selecting means 103 selects as the pivots N0 nouns from the N1 nouns selected in the first stage and further selects V0 cases from the V1 cases selected in the first stage. At this time, N0 and V0 are respectively arranged so as to be greater than the rank of the co-occurrence data C1. The selection of the nouns is made such that the feature vectors of the selected N0 nouns are linearly independent, the exception in the co-occurrence of the respective nouns is less, the dimension of the feature vector is as low as possible, and the azimuth in the vector space between given two feature vectors becomes as large as possible. The selection of the cases is effected as well as the selection of the nouns. However, in the case that the dimension of the feature vector is lower than the rank of the co-occurrence data C1, a 0-train is added at the tail of the vector so as to raise the dimension of the feature vector up to the rank of the co-occurrence data C1, thereby considering the linearly independence and the azimuth in the vector space.

In the sixth stage for building the co-occurrence dictionary, the co-occurrence information of the remaining N2 nouns other than the N1 nouns selected in the first stage is inputted to obtain the feature vectors of the N2 nouns. Here, the sum of N1 and N2 is equal to the number N of the entire nouns. First, as well as the second stage, the question sentence producing means 104 successively produces sentences in which the N2 nouns are respectively applied to the V0 cases selected in the fifth stage, and shows them to the co-occurrence information inputting person through the question sentence display means 105. The co-occurrence information inputting person decides whether the sentences are proper as the Japanese language and then inputs integer values in a range from 0 to M by means of the co-occurrence information inputting means 106. With the poorness of the reproduction being measured by the Euclidean distance, the feature vector calculating means 107 resolves the following variational equation (11) to obtain the feature vector of the noun, which can most properly reproduce the co-occurrence data C2 thus obtained, in accordance with the general method of least squares.

$$\sum_{j=1}^{V_0} (C_{ij} - a_{rj} \cdot b'_i)^2 \to \text{minimum} \quad (i = 1, 2, \ldots, N_2) \quad (11)$$

where $C'_{ij}$ is an element of the co-occurrence data C2, $a_{rj}$ is a feature vector of the $j^{th}$ pivot case of the V0 cases, and $b'_i$ is a variable indicative of the feature vector of the $i^{th}$ noun of the N2 nouns.

The feature vectors of the N2 nouns thus obtained, together with the other dictionary information, are stored in the noun semantic dictionary 108, thereby finally building the noun semantic dictionary 108.

In the seventh stage for building the co-occurrence dictionary, the co-occurrence information of the remaining V2 cases other than the V1 cases selected in the first stage is inputted to obtain the feature vectors of the V2 cases. Here, the sum of V1 and V2 is equal to the number V of the entire cases. First, as well as the second stage, the question sentence producing means 104 successively produces sentences in which the V2 cases are respectively applied to the NO nouns selected in the fifth stage, and shows them to the co-occurrence information inputting person through the question sentence display means 105. The co-occurrence information inputting person decides whether the sentences are proper as the Japanese language and then inputs integer values in a range from 0 to M by means of the co-occurrence information inputting means 106. With the poorness of the reproduction being measured by the Euclidean distance, the feature vector calculating means 107 resolves the following variational equation (12) to obtain the feature vector of the case, which can most properly reproduce the co-occurrence data C3 thus obtained, in accordance with the general method of least squares.

$$\sum_{i=1}^{N_0} (C''_{ij} - b_{si} \cdot a'_j)^2 \to \text{minimum} \quad (j = 1, 2, \ldots, V_2) \quad (12)$$

where $C''_{ij}$ is an element of the co-occurrence data C3, $b_{si}$ is a feature vector of the $i^{th}$ pivot noun of the N0 cases, and $a'_j$ is a variable indicative of the feature vector of the $j^{th}$ case of the V2 nouns.

The feature vectors of the V2 cases thus obtained, together with the other dictionary information, are stored in the verb semantic dictionary 109, thereby finally building the verb semantic dictionary 109.

For updating the co-occurrence dictionary, even in the case of changing a vocabulary already included in the semantic dictionary or even in the case of newly adding a vocabulary to the semantic dictionary, when updating the noun, an operation is effected as well as the above-described sixth stage for building the co-occurrence dictionary, and when updating the case of a verb, an operation is effected as well as the seventh stage for building the co-occurrence dictionary. Thus, it is possible to systematically and consistently perform both the building and updating of the co-occurrence dictionary.

Further, when it becomes clear that an error of the decision occurs in the co-occurrence analysis in terms of a combination of specific noun and case, an exception adding process can be effected wherein such a combination can be designated as a exception and added to the verb semantic dictionary 109.

Although in the above description the nouns and cases of the verbs in the Japanese language are taken as the object of the co-occurrence dictionary, the above-described method is also applicable, for example, to building and updating a co-occurrence dictionary between nouns and cases of adjectival verbs, or adverbs and auxiliary verbs and further to building and updating a co-occurrence dictionary for other languages such as English, French and German.

Figure 3:
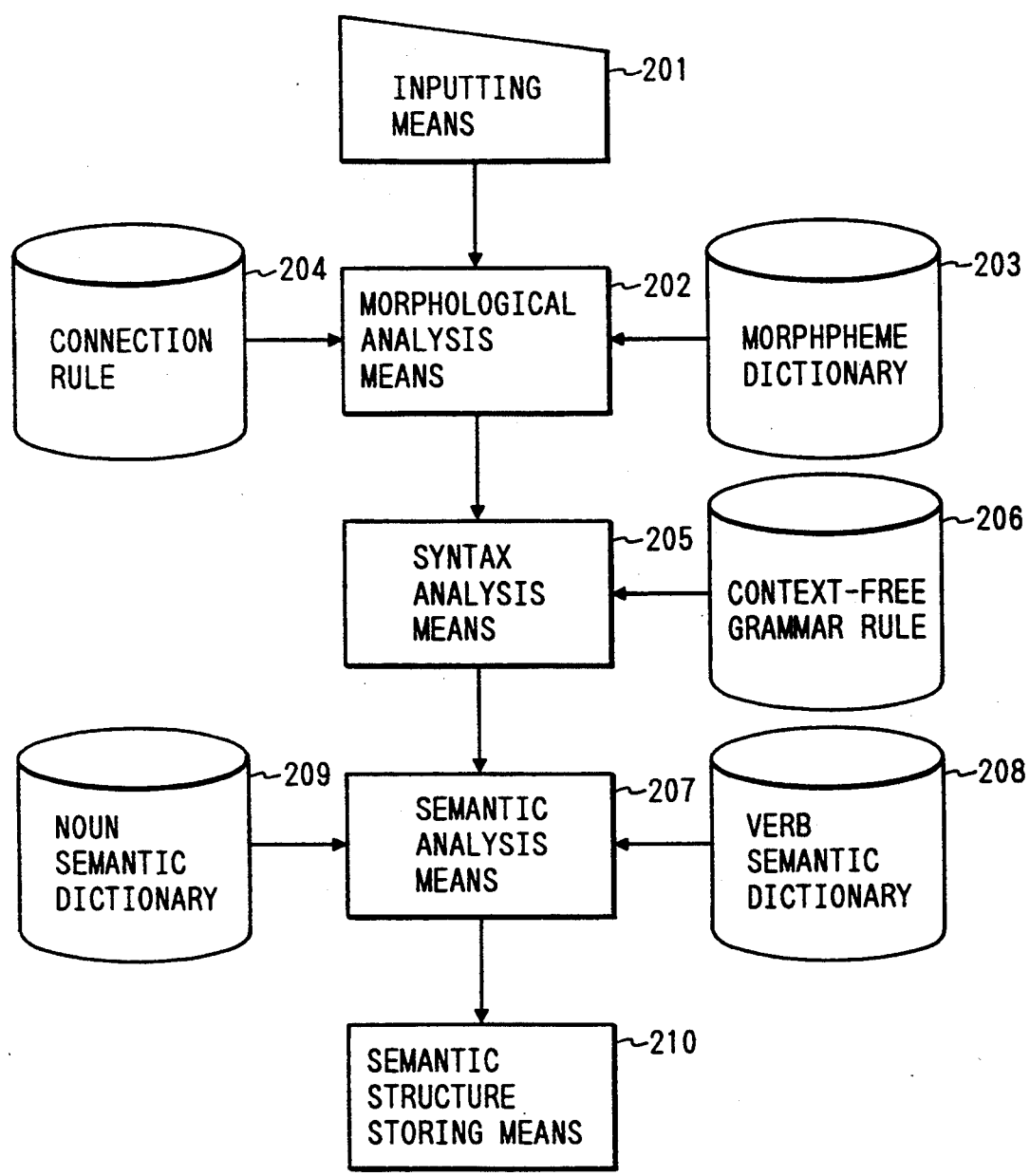
FIG. 3 is a block diagram showing a Japanese language sentence analysis apparatus according to a second embodiment of this invention.

Moreover, a description will be made hereinbelow with reference to FIGS. 3 to 7 in terms of a second embodiment of this invention. FIG. 3 is a block diagram showing a Japanese-language sentence analysis apparatus based on the semantic analysis method and co-occurrence analysis method according to this invention. In FIG. 3, numeral 201 represents an inputting means for inputting a sentence to be analyzed, 202 designates a morphological analysis means for dividing the sentence, inputted from the inputting means 201, into morpheme trains, 203 denotes a morphpheme dictionary to be retrieved by the morphological analysis means 202 when performing the morphpheme division, 204 depicts a connection rule to be used when the morphological analysis means 202 performs a connection examination between morphphemes, and 205 is a syntax analysis means for receiving the morphpheme trains from the morphological analysis means 202 to analyze the syntax structure and output a syntactic tree. Further, numeral 206 represents a context-free grammar rule to be used when the syntax analysis means 205 performs the syntax structure analysis, 207 designates a semantic analysis means for receiving the syntactic tree from the syntax analysis means 205 to perform the case analysis and output the semantic structure, 208 denotes a verb semantic dictionary to be used by the semantic analysis means 207, 209 depicts a noun semantic dictionary to be used by the semantic analysis means 207, and 210 is a semantic structure storing means for storing a semantic structure centering a case frame produced by the semantic analysis means 207, the semantic structure storing means being seen and operated by an external apparatus.

The noun semantic dictionary 209 to be used for the semantic analysis is made by building and updating the meaning of each noun in the morphpheme dictionary 203 in accordance with the above-described co-occurrence dictionary building and updating methods, and contains the notation 501, the reading 502 and the feature vector 503 for each vocabulary as illustrated in FIG. 6. In the verb semantic dictionary 208, the meaning of each verb in the morphpheme dictionary 203 is divided into one or more case patterns and described. As illustrated in FIG. 7, the nature of a noun which co-occurs with respect to each case slot is described with the notation 601, the reading 602, the case pattern 603 and the set 604 of feature vector and exceptional noun.

The operation of the sentence analysis apparatus thus arranged will be described, for example, in the case of analyzing a typed sentence "AがB をCに V する". First, the typed sentence is supplied as a character train (string) through the inputting means 201 to the morphological analysis means 202. The morphological analysis means 202 perform the morphpheme division process from the top of the sentence toward the end of the sentence. The morphological analysis means 202 retrieves the morphpheme dictionary 203. If a morpheme matched with a portion of the inputted character train is found by the retrieval, the connection possibility to the morphpheme immediately before the found portion is checked by the connection rule 204. If the connection is possible, the morphpheme division process is further effected in terms of the inputted character train next to the found portion. Here, in the case that a plurality of results are obtained when retrieving the morphpheme dictionary 203, the priority is given therebetween in accordance with the heuristic method such as the longest match and the minimum clause number. Thus, it is possible to obtain the following morphpheme train up to the end of the sentence.

"A (noun), が (case post-positional particle), B (noun), を (case post-positional particle), C (noun), に (case post-positional particle), V (verb), し (ending of verb), た (past auxiliary verb)"

Figure 14:
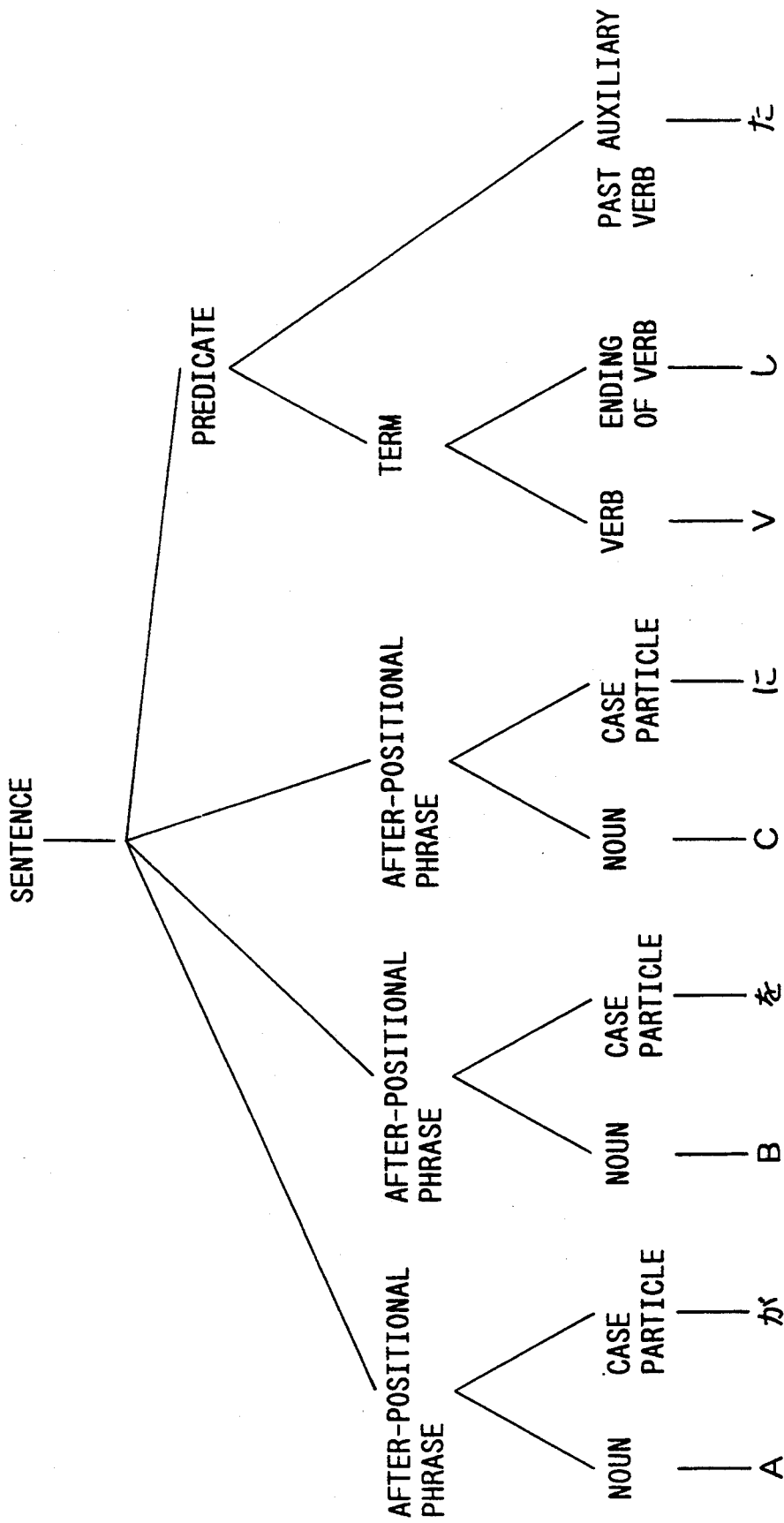
FIG. 14 shows one example of syntax trees.

This morphpheme train is led to the syntax analysis means 205 so as to analyze the syntax structure, thereby obtain the syntactic tree as illustrated in FIG. 14 as well as the conventional method. It is seen from this syntactic tree that all of the three post-positional phrases "Aが", "Bを" and "C に" are dependent on the verb phrase "V する".

Figure 4:
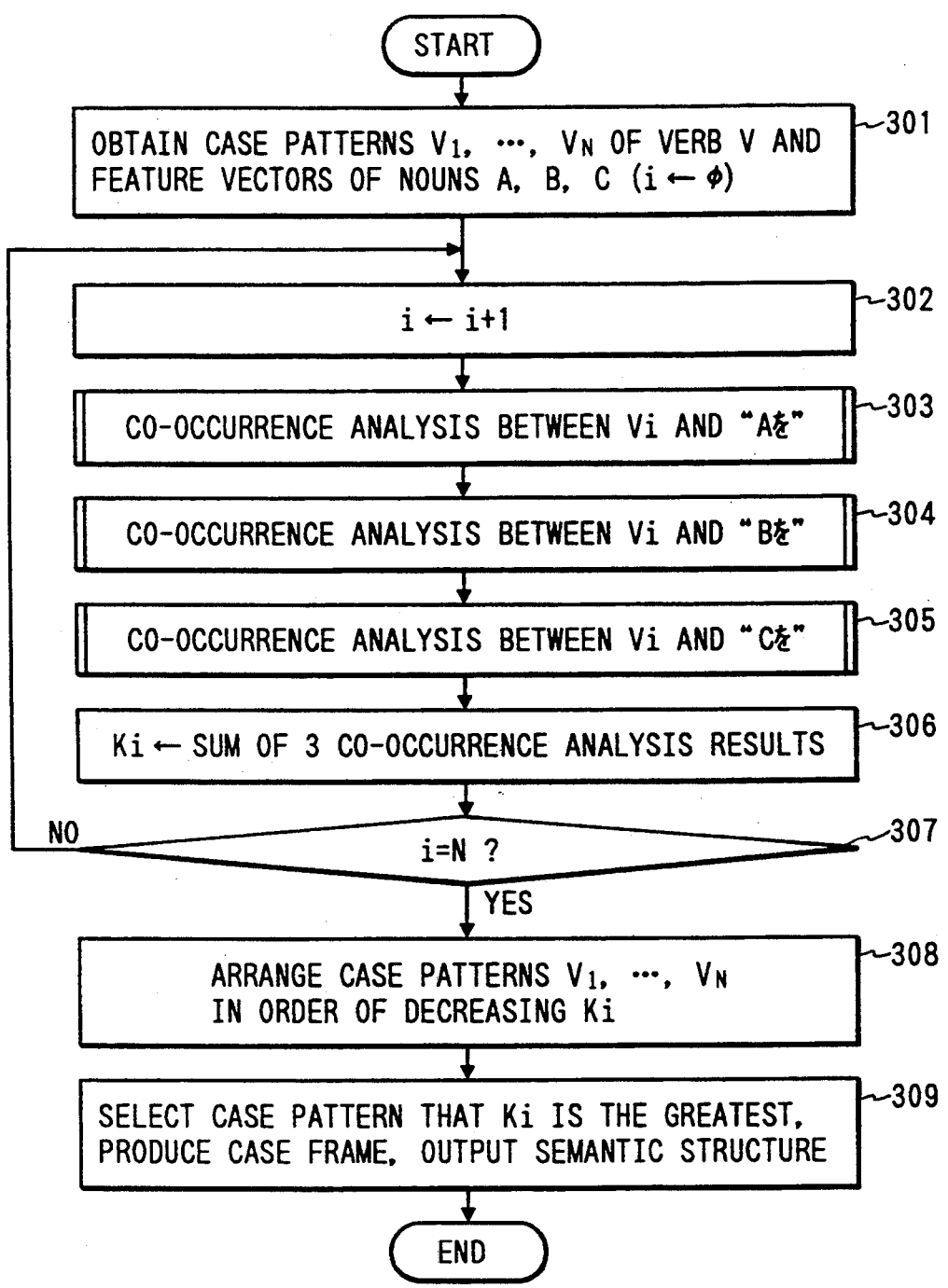
FIG. 4 is a flow chart for describing an operation for the semantic analysis according to the second embodiment of this invention.
Figure 5:
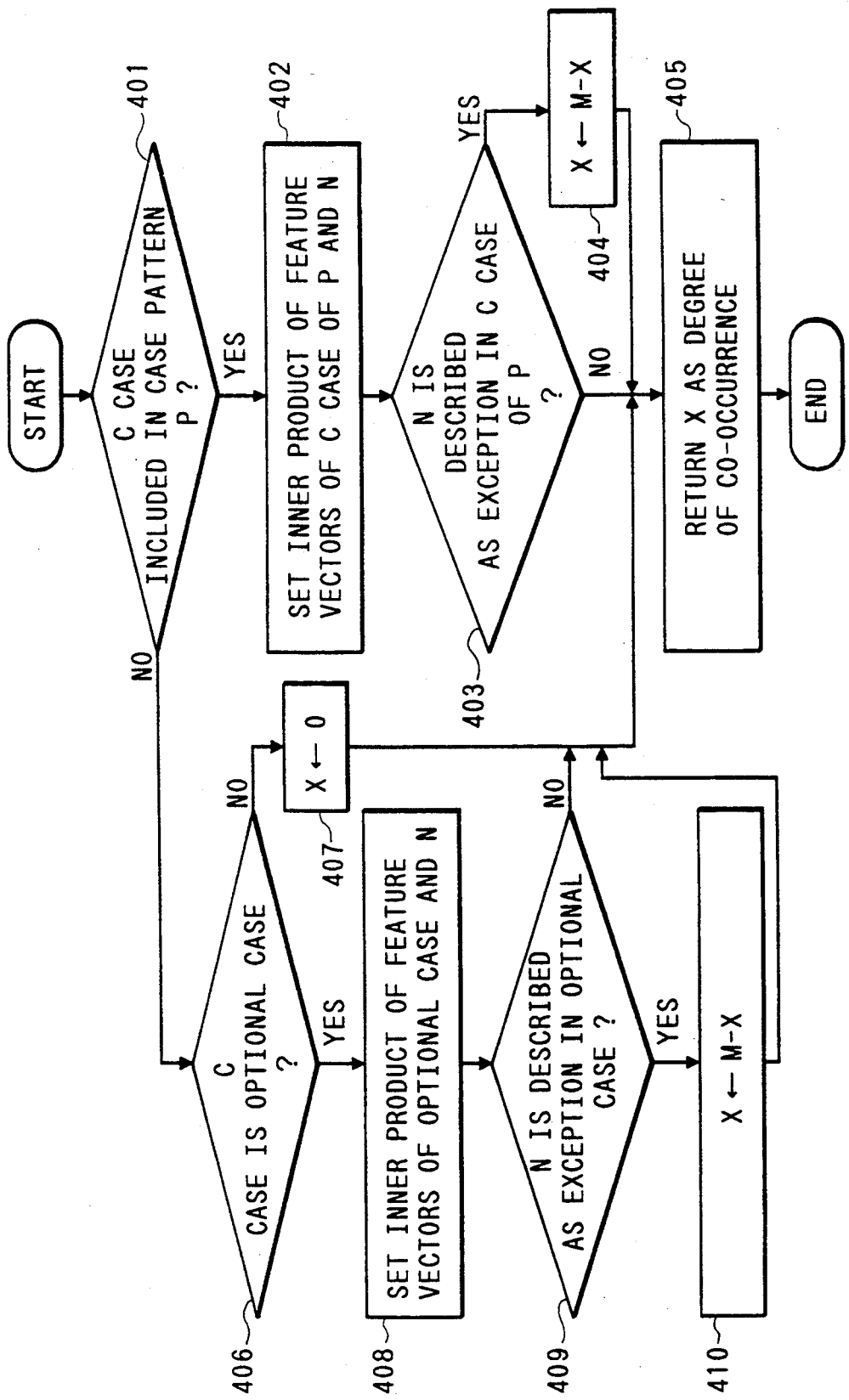
FIG. 5 is a flow chart for describing the co-occurrence analysis according to the second embodiment of this invention.
Figure 8:
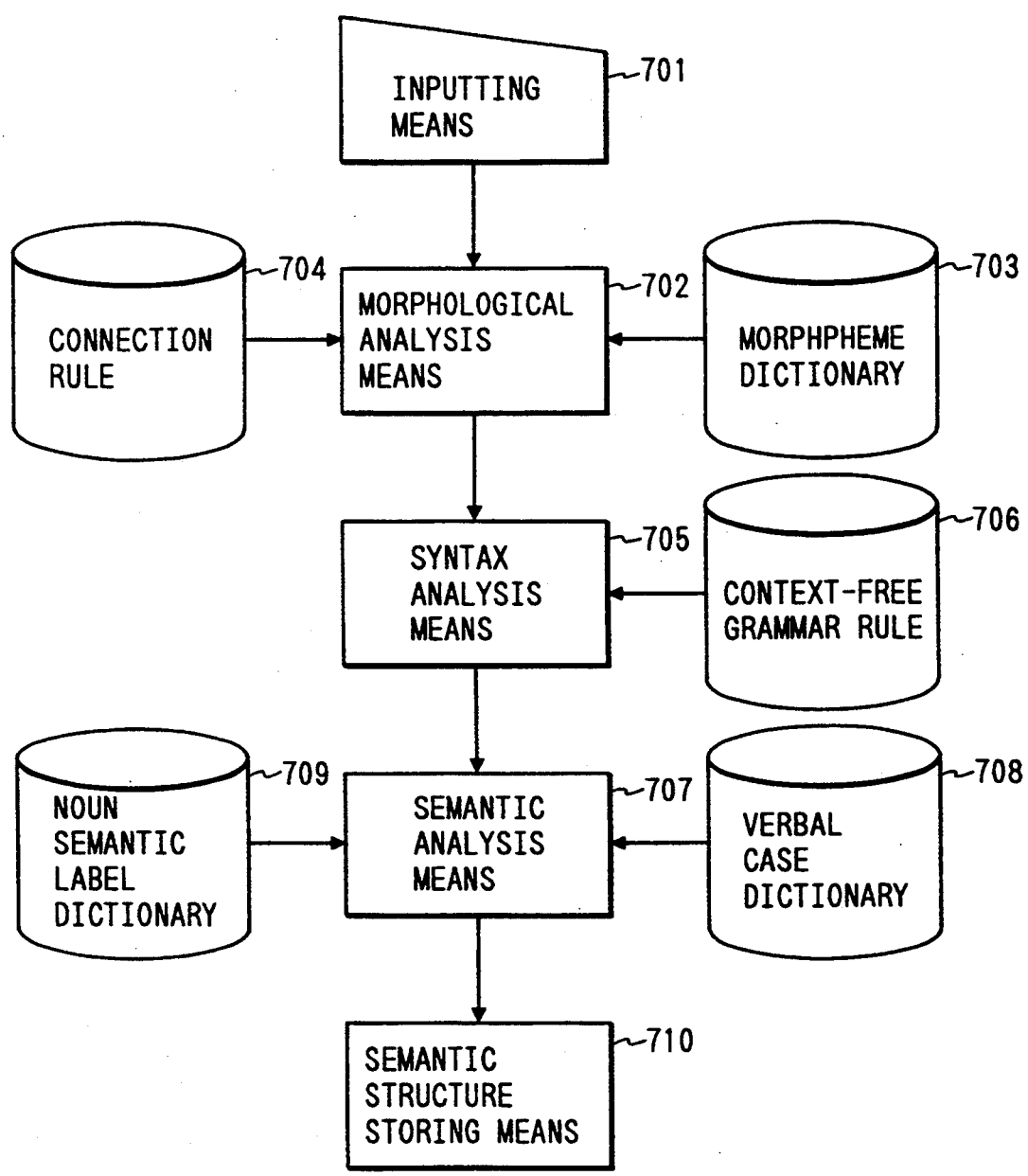
FIG. 8 is a block diagram showing a Japanese language sentence analysis apparatus based on a conventional semantic analysis method.
Figure 9:
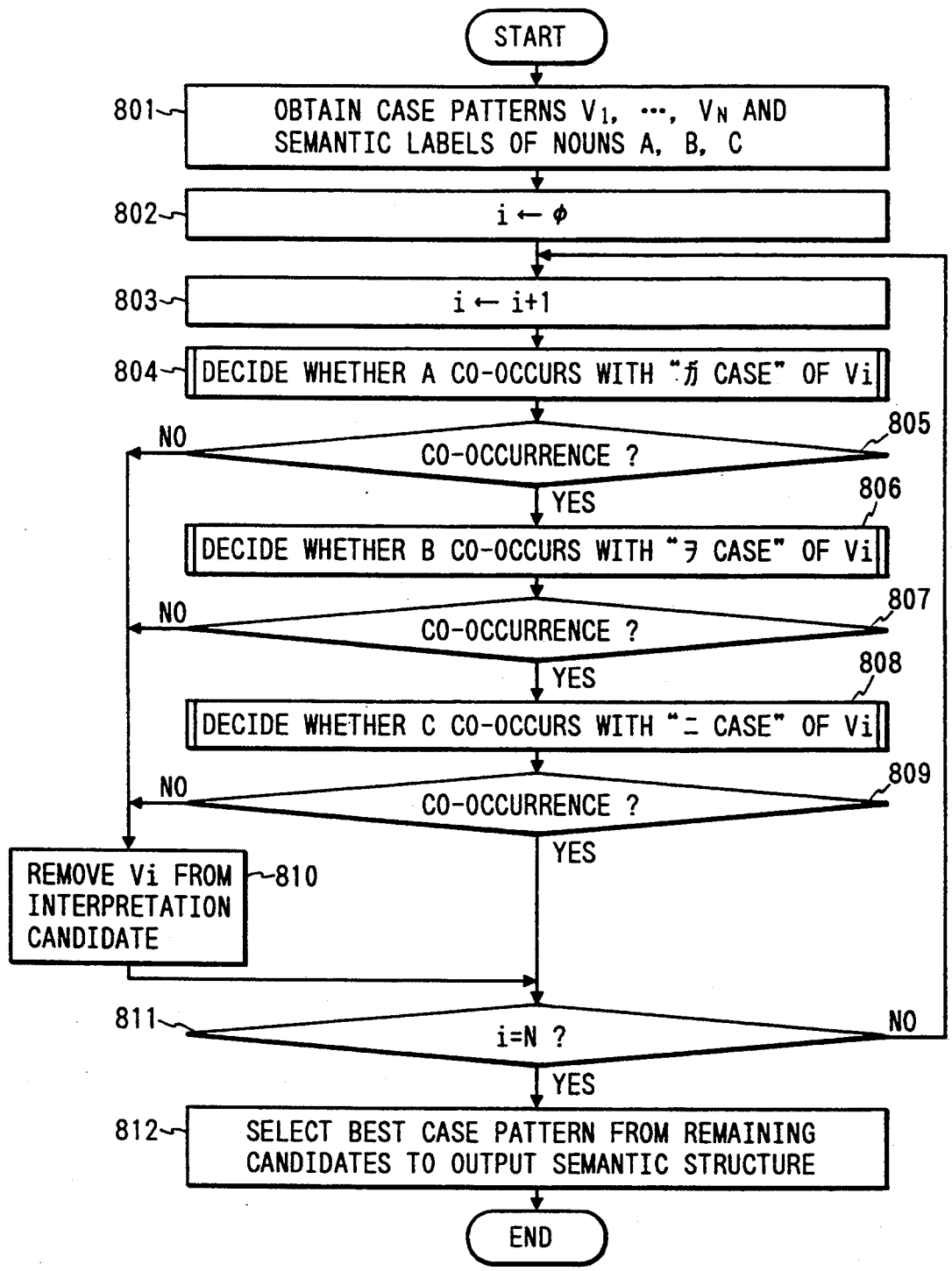
FIG. 9 is a flow chart showing an operation for the conventional semantic analysis.
Figure 10:
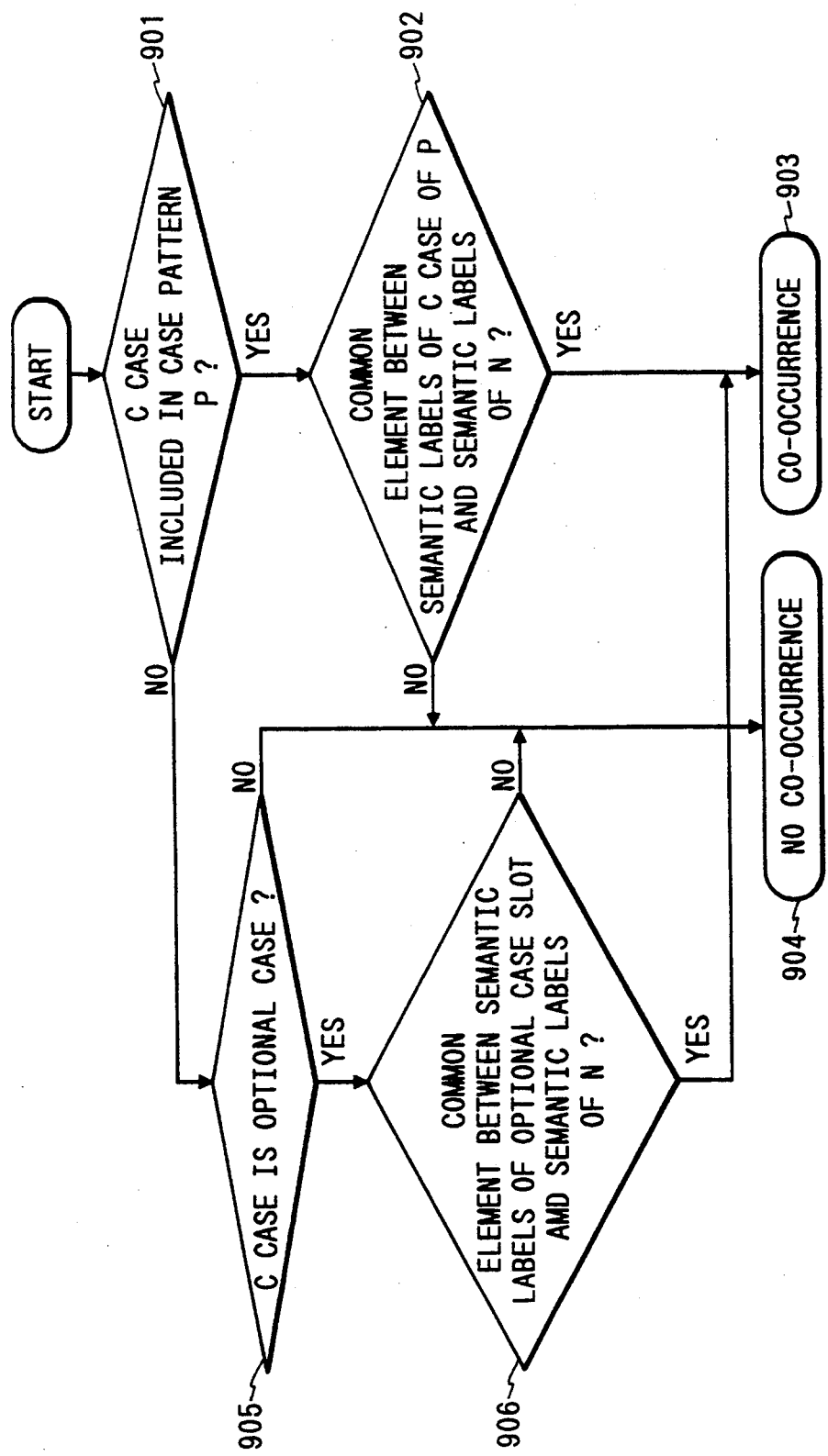
FIG. 10 is a flow chart showing an operation for a conventional co-occurrence analysis.

The FIG. 14 syntactic tree is delivered to the semantic analysis means 207 so as to perform the semantic analysis of the inputted sentence in accordance with the procedure shown in FIG. 4. First, the case patterns of the verb "V" and the feature vectors annexed thereto are obtained by the retrieval of the verb semantic dictionary 208, and the respective feature vectors of the nouns "A", "B" and "C" are obtained by the retrieval of the noun semantic dictionary (step 301). Thereafter, in terms of each of the case pattern of the verb V, the degree of the co-occurrence with respect to the case slot corresponding to the semantic label of the noun of each of the post-positional phrases is checked in accordance with the co-occurrence analysis procedure as illustrated in FIG. 5 (steps 302 to 305). The degrees of the co-occurrences of the three nouns are summed up (step 306) so as to convert the propriety of the case pattern into a numerical value (numerically evaluate it) to give the priority in order of decreasing the numerical value (steps 307 and 308), thereby selecting the best case pattern and add the information such as the tense and voice to the selected case pattern to output it as a semantic structure (step 309).

In the procedure of the co-occurrence analysis, as illustrated in FIG. 5, it is first checked whether the C case is included in the cases of the case pattern P (step 401). If the C case exists therein, the operation is effected to obtain the inner product X of the feature vector in the case slot of the C case of the case pattern P and the feature vector of the noun N (step 402), and it is checked whether the noun N is described as the exception in the C case in the verb semantic dictionary (step 403). If described, the operation is effected to subtract the inner product value X, calculated in the step 402, from the value M (see the above-described first embodiment) (step 404) to return the result as the degree of the co-occurrence (step 405). On the other hand, if not described, the inner product value X itself is returned as the degree of the co-occurrence (steps 404, 405).

If the answer of the step 401 is negative, it is checked whether the C case can assume an optional case such as the time and place (step 406). If the C case cannot be the optional case, the inner product X is set to 0 (step 407). On the other hand, if being the optional case, the case slot information of the optional case which does not depend on the verb is retrieved so as to obtain the inner product X of the feature vector in the optional case slot and the feature vector of the noun (step 408). Further, it is checked whether the noun N is described as the exception in the C case which is the optical case (step 409). If so, the operation is effected to subtract the inner product value X, calculated in the step 408, from the value M (see the above-described first embodiment) (step 410) to return the result as the degree of the co-occurrence (step 405). If not, the inner product value X itself is returned as the degree of the result of co-occurrence analysis (steps 409, 405).

With the above-described operation, the co-occurrence analysis and semantic analysis can easily be obtained with the inner product of the feature vectors which is a quantitative metric, and hence it is possible to easily perform the comparison between the interpretations and to easily give the priority. In addition, even if, for example, the category is the abstract noun which is difficult to be classified by the intuition, it is possible to accurately decide the degree of the co-occurrence by fine feature vectors calculated on the basis of the actual co-occurrence data.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A computer implemented method, implemented by a programmed computer, of building a co-occurrence dictionary describing whether phrases co-occur in one sentence, the phases belonging to first and second categories in a dictionary containing phrases of a natural language which is an object, said method comprising using the computer to build the co-occurrence dictionary by implementing the steps of:

selecting, as a first sub-group of phrases (11), phrases from a first group of phrases (1) comprising all phrases belonging to said first category in said dictionary;

selecting, as a second sub-group of phrases (21), phrases from a second group of phrases (2) comprising all phrases belonging to said second category in the dictionary;

preparing first co-occurrence information describing whether each phrase belonging to the first sub-group (11) and each phrase belonging to the second sub-group (21) co-occur in one sentence of the object language;

preparing second-co-occurrence information describing whether each phrase belonging to a third sub-group of phrases (12), comprising all the phrases in the first group (1) which do not belong to the first sub-group (11) and each phrase belonging to the second sub-group (21), co-occur in one sentence of the object language;

preparing third co-occurrence information describing whether each phrase belonging to a fourth sub-group of phrases (22), comprising all the phrases in the second group (2) which do not belong to the second sub-group (21) and each phrase belonging to the first sub-group (11) co-occur in one sentence of the object language;

arranging the first co-occurrence information such that each phrase belonging to the first sub-group (11) corresponds to a real number vector with a dimension below a common maximum dimension and each phrase belonging to the second sub-group (21) corresponds to a real number vector with a dimension below the common maximum dimension;

calculating a value of the real number vector corresponding to each phrase in the first sub-group (11) and a value of the real number vector corresponding to each phrase in the second sub-group (21) on the basis of the first co-occurrence information so that the number of sets of two phrases, wherein:

a value of an inner product of the real number vector corresponding to a first phrase and the real number vector corresponding to a second phrase becomes positive when describing, in the first co-occurrence information, that a first phrase belonging to said first sub-group (11) and a second phrase belonging to said second sub-group (21) co-occur in one sentence, and the value of an inner product of the real number vector corresponding to said first phrase and the real number vector corresponding to said second phrase becomes negative when describing, in said first co-occurrence information, that said first phrase belonging to said first sub-group (11) and said second phrase belonging to said second sub-group (21) do not co-occur in one sentence, becomes the greatest of all the numbers of sets each comprising phrases belonging to said first sub-group (11) and phrases belonging to the second sub-group (21);

arranging said second co-occurrence information such that each phrase belonging to said third sub-group (12) corresponds to a real number vector with a dimension below the maximum dimension;

calculating a value of the real number vector corresponding to each phrase in said third sub-group (12) on the basis of said second co-occurrence information so that the number of sets of two phrases, wherein:

a value of the inner product of the real number vector corresponding to a third phrase belonging to said third sub-group (12) and the real number vector corresponding to a fourth phrase belonging to said second sub-group (21) and calculated on the basis of said first co-occurrence information becomes positive when describing, in said second co-occurrence information, that the third phase and the fourth phrase co-occur in one sentence, and a value of an inner product of the real number vector corresponding to the third phrase and the real number vector corresponding to the fourth phrase becomes negative when describing, in said second co-occurrence information, that the third phrase and the fourth phrase do not co-occur in one sentence, becomes the largest of all the numbers of sets each comprising a phrase belonging to said third sub-group (12) and a phrase belonging to said second sub-group (21);

arranging said third co-occurrence information such that each phrase belonging to the fourth sub-group (22) corresponds to a real number vector with a dimension below the maximum dimension; and calculating a value of the real number vector corresponding to each phrase in the fourth sub-group (22) on the basis of said third co-occurrence information so that the number of sets of two phrases, wherein:

the inner product of the real number vector corresponding to a fifth phrase belonging to said first sub-group (11) and calculated on the basis of said first co-occurrence information and the real number vector corresponding to a sixth phrase belonging to the fourth sub-group (22) becomes positive when describing, in the third co-occurrence information, that the fifth phrase and the sixth phrase co-occur in one sentence and, on the other hand, the inner product of the real number vector corresponding to the fifth phrase calculated on the basis of the first co-occurrence information and the real number vector corresponding to the sixth phrase becomes negative when describing, in the third co-occurrence information, that the fifth phrase and the sixth phrase do not co-occur in one sentence, becomes the greatest of all the numbers of sets each comprising a phrase belonging to said first sub-group (11) and a phrase belonging to said fourth sub-group (22).

2. A method as claimed in claim 1, comprising the further step of:

correcting said first co-occurrence information by exceptionally reversing the decision of the co-occurrence with respect to a portion of said first co-occurrence information so that the number of sets of two phrases, wherein:

the value of the inner product of the real number vector corresponding to said first phrase belonging to said first sub-group (11) and the real number vector corresponding to said second phrase belonging to said second sub-group (21) becomes positive when describing that said first phrase and said second phrase co-occur in one sentence and the value of the inner product of the real number vector corresponding to said first phrase and the real number vector corresponding to said second phrase becomes negative when describing, in the first co-occurrence information, that the first phrase and the second phrase do not co-occur in one sentence, is above a constant rate to the number of all sets each comprising phrases belonging to the first sub-group (11) and phrases belonging to said second sub-group (21), and the corrected first co-occurrence information is used as said first co-occurrence information and the co-occurrence information are calculated in real number vector form with respect to all the phrases of said first group of phrases (1) and said second group of phrases (2) so as to calculate the co-occurrence information in the real number vector form and in exception information form.

3. A method as claimed in claim 1, further comprising the steps of:

when a new seventh phrase belonging to a first category is added to the built co-occurrence dictionary which describes whether each phrase belonging to said first category and each phrase belonging to a second category co-occur in one sentence in a dictionary containing phrases of a natural language, selecting a first select group of phrases in said dictionary, which consists of N phrases, of phrases belonging to said second category and which are above a maximum dimension of the corresponding vectors and in which the absolute value of an inner product of the real number vectors corresponding to every two phrases is below a constant value, so as to give additional co-occurrence information indicative of whether the N phrases and the seventh phrase co-occur in one sentence of said language;

arranging that said seventh phrase corresponding to a real number vector having a dimension below the maximum dimension; and calculating a real number vector corresponding to said seventh phrase so that the number M of sets of two phrases, wherein a value of the inner product of the real number vector corresponding to said seventh phrase and the real number vector corresponding to an eighth phrase belonging to the first select group of phrases becomes positive when describing, in said additional co-occurrence information, that said eighth phrase and said seventh phrase co-occur in one sentence and the value of the inner product of the real number vector corresponding to said seventh phrase and the real number vector corresponding to said eighth phrase becomes negative when describing, in said additional co-occurrence information, that the eighth phrase and the seventh phrase do not co-occur in one sentence, has a maximum so that the calculated real number vector is added as the co-occurrence information for the seventh phrase to said co-occurrence dictionary.

4. A method as claimed in claim 3, comprising the further step of, when the number M is below a predetermined number L, selecting a second select group of phrases whose number is constant from the second category to give readditional co-occurrence information indicative of whether said second select group of phrases and said seventh phrase co-occur in one sentence of the language so as to correct said additional co-occurrence information so that the co-occurrence decisions of said additional co-occurrence information and a portion of said readditional co-occurrence information are exceptionally reversed, and calculating the real number vector corresponding to said seventh phrase on the basis of the corrected additional co-occurrence information so that the number M become above the predetermined number L, and adding the calculated real number vector as the co-occurrence information for said seventh phrase to said co-occurrence dictionary.

5. A method as claimed in claim 3, further comprising the step of performing a co-occurrence analysis using said co-occurrence dictionary to automatically decide whether phrases which are included in said dictionary and which belong to first and second categories co-occur in one sentence, wherein, when said first phrase included in said first category in said co-occurrence dictionary and said second phrase included in said second category in said co-occurrence dictionary appear at positions, allowable on morphpheme and syntax, in the sentence to be analyzed, if the inner product of the real number vector corresponding to the first phrase and the real number vector corresponding to the second phrase is positive, a decision is made that said first phrase and said second phrase co-occur, and on the other hand, if the inner product of the real number vector corresponding to said first phrase and the real number vector corresponding to said second phrase is negative, a decision is made that said first phrase and said second phrase do not co-occur.

6. A method as claimed in claim 5, wherein, when said first phrase and said second phrase in the sentence to be analyzed are vague on a morphpheme and syntax, using the interpretation that the absolute value of the inner product of the real number vector corresponding to said second phrase and the real number vector corresponding to said first phrase calculated in accordance with the co-occurrence analysis method is the greatest value or a group of interpretations that the absolute value of the inner product is above a constant value, and rejecting the other interpretations.

7. A method as claimed in claim 6, wherein the natural language is the Japanese language, said first category is nouns, and said second category is deep cases of a predicate.

8. A method as claimed in claim 7, further comprising the steps of: calculating an inner product Q of a real number vector corresponding to each deep case in a plurality of deep case patterns P of the predicate in a sentence S to be analyzed and a real number vector corresponding to a noun which is applied to each deep case in the sentence S; and adding a weight proper to each deep case in the deep case patterns P to the inner product Q to adopt the deep case pattern, that the added value E is the greatest, as an interpretation for the deep case pattern of the predicate in the sentence S.

9. A method as claimed in claim 7, further comprising the steps of: calculating an inner product Q of a real number vector corresponding to each deep case in a plurality of deep case patterns P of the predicate in a sentence S to be analyzed and a real number vector corresponding to a noun which is applied to each deep case in the sentence S; and adding a weight proper to each deep case in the deep case patterns P to the inner product Q to adopt all the deep case patterns, that the added value E is above a predetermined constant value, as an interpretation for the deep case pattern of the predicate in the sentence S.

* * * * *